Jan. 19, 1965       F. BRONSTERT ETAL       3,166,447
APPARATUS FOR FORMING, CHARGING AND DISCHARGING THE
ELECTRODE PLATES OF A STORAGE BATTERY
WITH AN ACID ELECTROLYTE
Filed Aug. 19, 1960                5 Sheets-Sheet 1
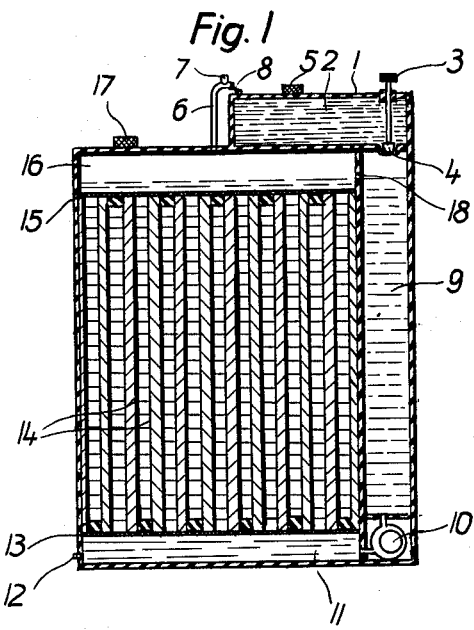
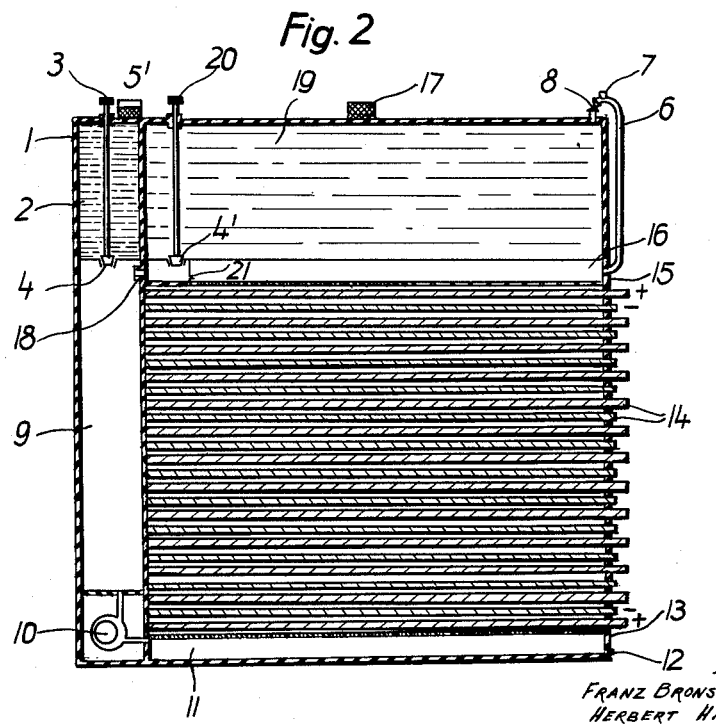
INVENTORS
FRANZ BRONSTERT, HANS BODE
HERBERT HAEBLER,
HANS-GEORG LINDENBERG
BY
M. H. Radde
AGENT.

Jan. 19, 1965    F. BRONSTERT ETAL    3,166,447
APPARATUS FOR FORMING, CHARGING AND DISCHARGING THE
ELECTRODE PLATES OF A STORAGE BATTERY
WITH AN ACID ELECTROLYTE
Filed Aug. 19, 1960    5 Sheets-Sheet 2
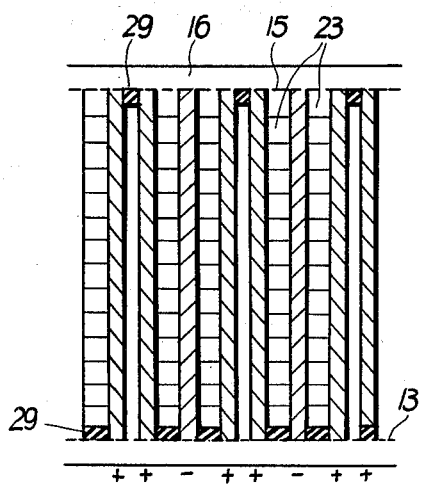
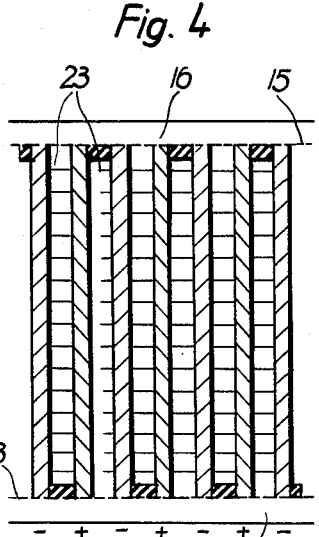
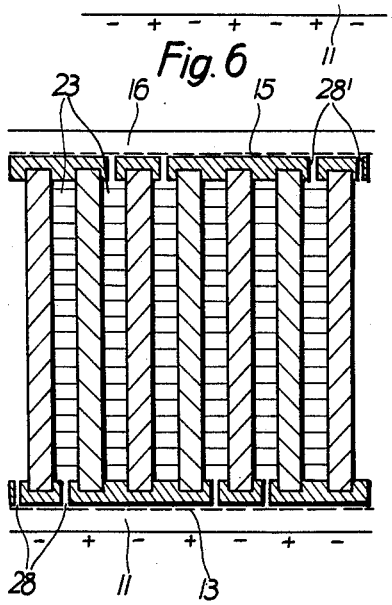
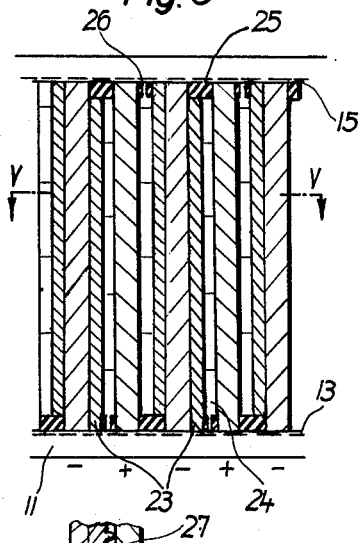
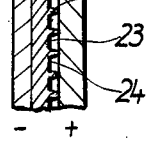
INVENTORS.
FRANZ BRONSTERT, HANS BODE
HERBERT HAEBLER
BY    HANS-GEORG LINDENBERG
Erich M H Racke
AGENT.

Jan. 19, 1965  F. BRONSTERT ETAL  3,166,447
APPARATUS FOR FORMING, CHARGING AND DISCHARGING THE
ELECTRODE PLATES OF A STORAGE BATTERY
WITH AN ACID ELECTROLYTE
Filed Aug. 19, 1960  5 Sheets-Sheet 3
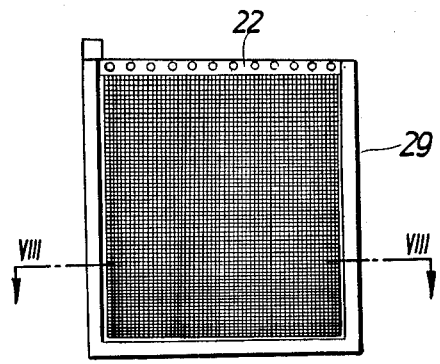
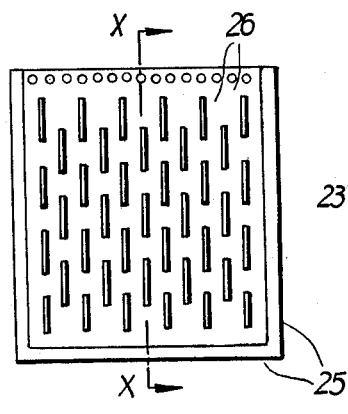
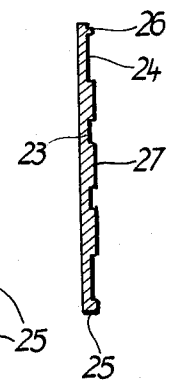
INVENTORS.
FRANZ BRONSTERT, HANS BODE
HERBERT HAEBLER
BY  HANS-GEORG LINDENBERG
AGENT.

Jan. 19, 1965  F. BRONSTERT ETAL  3,166,447
APPARATUS FOR FORMING, CHARGING AND DISCHARGING THE
ELECTRODE PLATES OF A STORAGE BATTERY
WITH AN ACID ELECTROLYTE
Filed Aug. 19, 1960  5 Sheets-Sheet 5

INVENTORS.
FRANZ BRONSTERT, HANS BODE
HERBERT HAEBLER
BY  HANS-GEORG LINDENBERG

AGENT.

3,166,447
APPARATUS FOR FORMING, CHARGING AND DISCHARGING THE ELECTRODE PLATES OF A STORAGE BATTERY WITH AN ACID ELECTROLYTE

Franz Bronstert, Homburg vor der Höhe, Hans Bode and Herbert Haebler, Frankfurt am Main, and Hans-Georg Lindenberg, Hannover, Germany, assignors to Varta Aktiengesellschaft, a corporation of Germany
Filed Aug. 19, 1960, Ser. No. 50,668
Claims priority, application Germany, Aug. 19, 1959, A 32,693
23 Claims. (Cl. 136—82)

The present invention relates to a method and means for forming, charging and discharging, preferably with a high current density, the electrode plates of a storage battery with an acid electrolyte, such as lead-acid batteries.

Conventionally, storage batteries of this type comprise a set of electrode plates of opposite polarity immersed in an acid electrolyte, the electrode plates consisting of lead or lead alloy grids carrying porous active material. From the first beginnings of such batteries, it has always been desired to make the best possible use of the active electrode mass so as to increase the capacity of the batteries.

Particularly with such current discharge requirements as in starting batteries for internal-reciprocating combustion engines, it has become evident that the capacity of the conventional batteries is much smaller than may be calculated from the amount of the active material in the electrodes. Also, it has been found impossible to charge storage batteries or to form the storage battery plates in a short period of time. It has appeared that optimum results in the formation and in the charging and discharging cycles were tied to relatively long periods of time for each cycle, which were measured in hours.

The reason for this has long been known because in all types of storage batteries which operate with an electrolyte which chemically participates in the formation, charging and discharging of the plates, the concentration of the electrolyte naturally varies during these cycles. Differences in the electrolyte concentration can be equalized in a common chamber only by diffusion or, faster, by the artificial circulation of the electrolyte. Generally speaking, the following essential considerations prevail:

The diffusion may be expedited by decreasing the viscosity of the electrolyte and by making the zones of different concentration as thin as possible. It has been found that the differences in the concentration of the battery electrolyte are caused by the differential use of the portion of the electrolyte within the active electrode mass as compared to the electrolyte portion in the interspaces between the electrode plates. By suitably choosing the geometric form of the space occupied by the active mass as well as the distance between the electrode plates, the most favorable operating conditions may be obtained, with due attention being paid to structural necessities.

It has also been proposed—although with limited practical success—to speed up the diffusion by heating the electrolyte and, thus, increasing its kinetic energy.

Various steps have also been proposed to equalize the electrolyte concentration differentials by forced movement of the electrolyte. It was first proposed to tilt or otherwise move the electrolyte to mix it. This, however, equalized only the concentration of the electrolyte in the interspaces between the electrode plates, which is relatively unimportant for the capacity increase of the battery. Later on it was proposed to force the electrolyte to circulate through the pores of the actvie material of the electrolyte plates. This was designed to eliminate concentration differences in the entire electrolyte but the concentration of the entire electrolyte must naturally rise during the charging cycle and decrease during the discharge cycle on continued operation of the battery.

None of these devices have been practical successes, one of the primary reasons being the structural difficulties encountered in their execution. However, investigations have clearly shown how considerably the concentration of the electrolyte changes during the charging and discharging cycles despite its continuous mixing. Considering particularly the discharging cycle, it has been proposed to increase the capacity of a storage battery by equalizing the decreasing electrolyte concentration not only by thoroughly mixing the electrolyte but by adding electrolyte so that the concentration of the electrolyte during the entire discharge cycle is maintained at an optimum level. It was expected that this would considerably delay the voltage decrease during the discharge. Accordingly, it has been proposed to circulate the electrolyte through the active mass of the electrode plates and to maintain the acid density in the active mass practically constant during discharge and charge by adding electrolyte from a container outside the battery container.

In these conventional system, the intention has been to maintain the concentration of the electrolyte within the active mass during the discharge at the level prevalent before the beginning of the discharge. Since only a predetermined amount of additional electrolyte was available for each discharge cycle, which electrolyte had the same concentration as the electrolyte in the battery container before the discharge began, the maintenance of the concentration level of the electrolyte in the active mass can only be approximated and even this only if the battery is subjected to the same load during the charge and discharge cycles. For this purpose, constant amounts of acid must be fed in the time unit and this can be done only by increasing the electrolyte pressure to compensate for the increasing resistance to the electrolyte circulation due to the formation of lead sulfate during the discharge and by correspondingly decreasing the electrolyte circulation pressure during charging. Furthermore, the amount of the discharged electrical energy and the subsequently stored electrical energy must be the same. These conditions considerably limit the period of time for charging and discharging of the battery, which are advantageously in the range of relatively long charge and discharge cycles. Even this system, however, has failed to achieve practical success.

It is one object of the present invention to overcome the indicated disadvantages and to improve the latter system so that the charge and discharge cycles are largely independent of the time element.

It is another object of this invention to provide a practical system for simultaneously charging and discharging an assembly of battery cells.

It is a further object of the invention to apply such a system not only to the charge and discharge cycles but also to include the formation of the electrode plates in the system operating with a circulating electrolyte.

The above and other objects and advantages are accomplished in a storage battery system by the combination of certain essential features. In the first place, according to the invention, water or an electrolyte of different concentration, which is independent of the charging and discharging cycles, is continuously or periodically added to a circulating electrolyte to control the specific weight of the electrolyte positively whereby a desired specific weight level is obtained at each operating cycle.

According to another important feature, simple means is provided for effectively sealing the electrode plates in the battery container so that the electrolyte is forced to penetrate through the active mass of the electrodes of at least one polarity. Preferably, means is provided for permitting different amounts of electrolyte to circulate through the electrode plates of different polarity. The system is useful for the formation cycle by adjusting the density of the constantly circulating electrolyte to the optimum level by the addition of water, while the electrolyte is cooled.

In the storage battery art, formation is the first charge of the raw positive and negative electrode plates which consist essentially of basic lead compounds, lead dust, and lead sulfate. Before the formation proper, the plates are soaked in sulfuric acid heated to about 30° C. and being of an approximate density of about 1.06. After about one hour, the plates are formed by applying a voltage of predetermined strength. During the first hour of formation, the density of the sulfuric acid decreases from about 1.06 to about 1.03, while more sulfuric acid is bound to the lead compounds on the plates than is freed from the lead sulfate in the plates under the influence of the formation current. Only after the initial decrease, the density of the acid in the electrolyte container rises again but the density of the sulfuric acid within the active electrode mass increases considerably more than that of the acid between the plates. Investigations have shown that the maximum density of the acid in the active mass reaches a value of about 1.6 during the formation. Streaks of concentrated sulfuric acid may be observed to drop to the bottom of the container from the surfaces of the positive and the negative electrode plates. These conventional formation conditions have the disadvantage that the voltage increases abnormally fast in the porous lead mass, due to the high acid density, wherefor the positive and the negative plates reach the point of gassing much more quickly than would be the case if the acid concentration could be maintained in the porous lead mass or in the lead dioxide at the original level. Thus, the super concentration of acid in the interior of the plates limits the intensity of the formation current and leads to premature gassing, which most disadvantageously influences the life of the plates and the formation in the core of the plates. Simultaneously, the surfaces of the plates are located overheated, due to the mixing of the strongly concentrated acid in the plate interior and the relatively thin formation acid, which also has a damaging influence on the plates. These conditions have made it impossible to obtain the desired formation of the active material in the interior of the plates to the fullest degree.

When formation is effected according to the present invention with a circulating electrolyte, the concentrated acid and gas bubbles are constantly forced out of the active mass of the electrode plates. For this reason, the current density of the formation current may be multiplied and the formation time reduced accordingly to about one-tenth of the usual forming time. Such reduced forming times can be obtained because the considerable heat developing due to the high amperage is dissipated by continuous cooling of the electrolyte and the controlled addition of water to the formation electrolyte to obtain the optimum acid concentration. This considerably improves the formation conditions and it is unexpected to find that the rapidly formed electrode plates are particularly adapted for the discharge of current of high density and have a capacity double to triple that of conventionally formed plates.

The above and other objects, advantages and features of the present invention will be more particularly set forth in the following detailed description of certain preferred embodiments thereof, taken in conjunction with the accompanying drawings, wherein FIG. 1 is a vertical section of a storage battery embodying the present invention;

FIG. 2 is a vertical section of another embodiment of a dry-charged battery;

FIGS. 3 to 6 are sections showing preferred arrangements of the electrode plates in storage batteries according to the present invention, FIG. 5a being a section along line A—A' of FIG. 5 to show a detail of the so-called recessed separators;

FIG. 7 is a top view of an electrode plate grid with a sealing frame;

FIG. 8 is a section along line VIII—VIII of FIG. 7;

FIGS. 9 and 10 are top and sectional views, respectively, of the recessed separator of FIGS. 5 and 5a;

Like reference numerals refer to like parts in all figures and, for the sake of clarity, the means for controlling the electrolyte concentration has been omitted in FIGS. 11 to 14.

Figure 11:
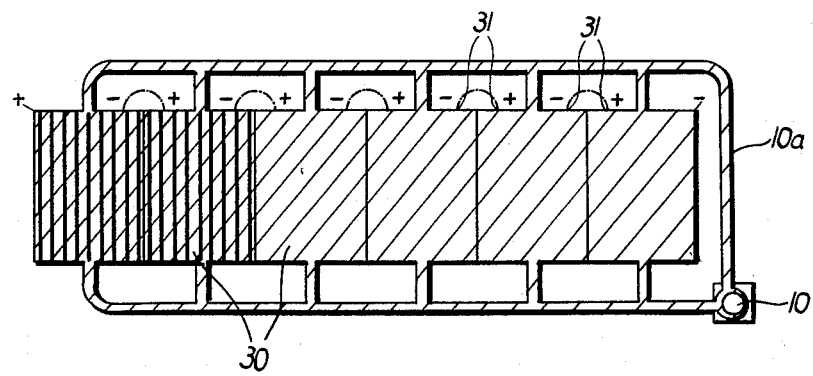
FIGS. 11 and 12 are schematic views of an assembly of storage battery cells fed by a single circulating electrolyte stream in the embodiment of FIG. 11 and adjacent cells being fed by different electrolyte streams in FIG. 12.

Referring now to FIG. 1, there is shown a lead-acid storage battery incorporating one embodiment of the system of the present invention. The battery electrolyte container houses the positive and negative electrode plates 14 which are held between horizontally disposed, apertured plates 13 and 15. A housing defining an electrolyte distributing chamber 11 is arranged below the electrolyte container and another housing defining an electrolyte overflow chamber 16 is arranged above the container, both chambers being in communication with the container through apertured plates 13 and 15. Another housing defining an electrolyte mixing chamber 9 is laterally adjacent the container and is in communication with the overflow chamber 16 through port 18. The input of pump 10 is in communication with the mixing chamber 9 and the output of pump 10 discharges the mixed electrolyte into distributing chamber 11, the pump causing the electrolyte to be circulated and pressed through the active mass of plates 14.

A housing defining an addition chamber 1 forms part of the assembly and constitutes means for controlling the specific weight of the circulating electrolyte to obtain a desired specific weight level at each cycle of operation by adding to the electrolyte a liquid medium 2, which may be water or an electrolyte of different concentration, which is independent of the operating cycle. The needle valve 3 cooperates with the valve set 4 constituting an inlet means for the liquid medium so as to control its flow to obtain the desired electrolyte concentration. Additional liquid medium may be introduced into the addition chamber 1 through inlet 5 which may be closed by a suitable threaded cap.

A gas removal conduit 6 connects the overflow chamber 16 with the addition chamber 1 to equalize changes in the gas and liquid volumes. The conduit 6 carries a pressure relief valve 7 to permit excess gases to escape during formation, charging and discharging. The gas removal conduit 6 has a spring-controlled valve 8 at its entrance to the addition chamber 1, which permits air to enter into the addition chamber while liquid flows out of overflow chamber 16, while simultaneously preventing flow of liquid 2 into the overflow chamber. The liquid medium 2 enters through inlet 4 into the mixing chamber 9 where it is mixed with the circulating electrolyte to obtain the desired electrolyte concentration, whereupon the electrolyte with the desired specific weight is circulated through the battery by pump 10 which presses the electrolyte into distributing chamber 11 through apertured plate 13, the plates 14, apertured plate 15, into the overflow chamber 16 and back into the mixing chamber 9 through port 18. The battery is filled with electrolyte through inlet 17, which may be closed by a suitable threaded cap, and may be emptied through outlet spout 12.

The electrode plates of the described storage battery may be readily formed by removing a portion of the circulating electrolyte through outlet 12, diluting it with water, cooling it, and then introducing it again through inlet 5 and/or 17. Alternatively, a portion of the electrolyte may be removed by suction through a pipe placed into outlet 17 and the water-diluted and cooled electrolyte may then be re-introduced through inlet 5. If desired, the liquid medium in addition chamber 1 and the electrolyte in mixing chamber 9 may be additionally cooled by a cooling jacket (not shown).

To control the specific weight of the circulating electrolyte during the discharge cycle, the needle valve 3 may be manually or automatically operated, the latter being done particularly if a series of battery cells are to be fed by streams of circulating electrolyte. For this purpose, an electrolyte density indicator means may serve to control the needle valve operation.

In accordance with one feature of the invention, the pump 10 may be operated with a small portion of the current discharged from the battery, the delivery rate of the pump conforming to the total current discharge during a time unit.

In the case of rapid discharges, i.e., with a discharge current of more than 100 amperes, it has proved to be advantageous to maintain the specific weight of the electrolyte unchanged by adding electrolyte liquid of higher concentration. For certain operating conditions, for instance, where either the amperage or the voltage are to be maintained constant, other influences on the specific weight of the electrolyte may appear desirable. Therefore, in special cases, the housing 1 may be subdivided into two chambers, one containing water and the other a concentrated electrolyte liquid medium.

An additional advantage obtained by the hereinabove described system is the temperature rise of the electrolyte due to the mixing heat, which further increases the capacity of the storage battery. It is, of course, also possible to seat the electrolyte before or during the operation of the battery in mixing chamber 9, distributing chamber 11, and/or addition chamber 1 by means of an immersion heater or by any other heat source.

FIG. 2 shows an embodiment of a dry-charged storage battery which has been found particularly useful for heavy current discharge. All parts of the battery which are unchanged from the embodiment of FIG. 1 carry the same reference numerals and operate identically. A description of such parts is, therefore, not required.

In this embodiment, the inlet 5' for addition chamber 1 has a valve permitting the replacement of the liquid medium by air. The entire electrolyte is stored in storage chamber 19, which may be opened by operation of needle valve 20, cooperating with valve seat 4'. When valve 20 is opened, the electrolyte flows through port 18 into mixing chamber 9, check valve 21 preventing the electrolyte from entering overflow chamber 16.

Obviously, the battery can deliver current for the operation of pump 10 immediately after an electrolyte penetrates into the electrode plates 14 only if the electrolyte may freely flow through the pump to pass through distributing chamber 11, apertured plate 13, and into the electrode plates 14, whereupon current is produced and may be discharged from the battery, to deliver the necessary current for the operation of the pump. Thereupon, the pump circulates the electrolyte in the same manner as in FIG. 1, the air displaced from the chambers by the circulating electrolyte being forced into storage chamber 19 through gas removal conduit 6 and valve 8. The electrolyte itself flows through the one-way check valve 21 from overflow chamber 16 through port 18 back into the mixing chamber 9, to maintain the electrolyte circulation.

In all other aspects, the battery of FIG. 2 operates in the same manner as that of FIG. 1 and although the addition chamber 1 and the storage chamber 19 have been illustrated as arranged above the electrolyte container, they could be arranged in any dead space in the storage battery. However, in the case of dry-charged batteries, sufficient electrolyte must be able to be gravity-fed through pump 10 into the electrode plates, after valve 20 is opened, to permit sufficient current to be generated to operate the pump.

Since the electrode plates in the embodiment of FIGS. 1 and 2 do not take up the entire space of the cell, the plates must be held in position by special means. The simplest plate holding means consists of the upper and lower apertured plates 15 and 13, which are preferably made of an insulating material, for instance, an electrolyte-resistant synthetic resin of any suitable composition. Such apertured plates also serve to equalize the hydrostatic pressure in the cell.

The arrangement of the electrode plates between the apertured insulating plates may be effected in two ways:

(1) As shown in FIG. 1, the electrode plates may be arranged perpendicularly to the apertured plates or, (2) As shown in FIG. 2, they may be parallel to the apertured plates.

Both arrangements have their advantages and disadvantages, depending on the desired use of the battery, but measures are taken in either case to make certain that the circulating electrolyte actually passes through the active mass of the electrodes of at least one polarity, i.e., the positive electrodes. This is accomplished by preventing the electrolyte from by-passing the electrodes along an inner wall of the electrolyte container. Therefore, fluid-impermeable sealing means is provided in the spaces between the electrode edges and four of the six inner walls of the electrolyte container.

Where the positive and negative electrode plates, separated by separators, are arranged parallel to the apertured end plates (see FIG. 2), the electrodes being connected in series in all storage batteries, all four edges of the electrode plates must be sealed against the inner walls of the electrolyte container. The fluid-permeable sealing may be accomplished in a variety of ways, among which are the following possibilities:

(1) The inner walls of the electrolyte container carry an electrolyte-resistant, elastic lining which makes firm contact with the edges of the electrode plates when they are mounted in the container. The lining may be of rubber or any suitable plastic such as polyisobutylene.

(2) The inner walls of the electrolyte container are lined as described under (1) but the lining material is adapted rapidly to swell when in contact with the electrolyte so as to form a seal with the electrode plate edges. Such materials are, for instance, polyvinylalcohols and cellulose-derivatives.

(3) The electrode plates carry a circumferential frame of an elastic insulating material, for instance, rubber, which also carries the separator, and after the framed plates are stacked in the electrolyte container, a synthetic resin such as urea- and phenol-formaldehyde resins or polyester-, epoxy- and melamine resins is cast into the interspace between the plate frames and the inner walls of the container, and the resin is cured. Experiments with storage batteries constructed according to the present invention have shown that a particularly advantageous discharge is obtained when the negative plates have a large surface and the entire active mass of the positive plates is in intimate contact with the electrolyte. Without noticeably decreasing the energy output of these storage batteries, the flow resistance of horizontally arranged electrode plates 14 may be decreased by making the area of the negative plates a little smaller than that of the positive plates, only the latter being flush with the inner walls of the electrolyte container while the electrolyte may bypass the negative electrodes and only partially passes therethrough. A similar decrease in the flow resistance may be accomplished by leaving some areas of the negative plate grids free of active mass while negative and positive plates are of the same over-all area.

A further means for minimizing the resistance to the electrolyte flow is the alignment of the lugs of the positive and negative electrode plates.

A certain pressure head within the electrode plates 14 has been found advantageous wherefor it is preferred to provide means in the electrode plates for increasing the resistance to the flow of electrolyte in the direction of the flow. This may be accomplished by decreasing the porosity and/or increasing the thickness of succeeding electrode plates in the direction of the electrolyte flow.

As can be seen from FIG. 2, the horizontally arranged electrode plates 14 are quite thin and large in number while the separators are microporous and very thin. The electrode plates are so tightly packed that no space is left for accommodating unneeded electrolyte. For this reason, the present batteries require no larger volume, despite additional chambers 1 and 19.

Because of the great number of stacked electrode plates, as shown in the embodiment of FIG. 2, pump 10 must have a high capacity to keep the electrolyte moving through the electrode plates despite the considerable resistance to its flow. Therefore, it has been found advantageous for certain purposes, for instance, if a relatively high-viscosity electrolyte or a great many electrode plates are used, to arrange the electrode plates perpendicularly, rather than parallel, to the apertured end plates 13 and 15. As shown in the embodiments of FIGS. 3 to 6, the electrolyte passes only through a single plate during each cycle in such an electrode arrangement.

FIGS. 3 and 6 show only portions of the electrode arrangement sufficient to illustrate the same. In FIG. 3, one negative electrode plate alternates with two positive plates and, as shown best in FIG. 7, U-shaped fluid-impermeable frames 29 of elastic, electrolyte-resistant insulating material, for instance, rubber, seals the spaces between the adjacent positive plates at upper apertured plate 15 and the inner walls of the electrolyte container. Thus, each pair of positive electrodes is formed into an electrode with a cavity, the negative plates arranged between each such electrode being sealed off against electrolyte access by like frames 29a at the lower apertured plates 13 and the inner walls of the container. Thus, the circulating electrolyte can pass only into the cavity in each pair of positive plates, is forced to pass through the two positive plates, and, flowing past separators 23 and the negative plates, enters into overflow chamber 16.

FIG. 7 illustrates the sealing frame 29 which is made of elastic insulating material (such as rubber or polyisobutylene) and surrounds the positive plate grids along three of its edges and leaves only one edge free for the passage of electrolyte. The knubs 22 along the free edge are of the same material as the sealing frame 29 and serve as spacers between the plates. As shown in the section of FIG. 8, the sealing frame slightly protrudes from the plate edges so as to provide a fluid-impermeable three-sided seal when the plates are mounted in the electrolyte container.

FIG. 4 shows a modification of the plate arrangement wherein plates of negative polarity alternate with plates of positive polarity and the U-shaped sealing frames are inserted between adjacent plates to seal the spaces between the plates and the inner walls of the electrolyte container as well as between the upper and lower apertured end plates, respectively, of alternating electrode plates. In a preferred embodiment, the negative electrode plates are thicker and/or less porous than the positive plates.

In the arrangement of FIG. 4, the electrolyte is forced to pass through the active mass of the electrodes of both polarities but the indicated preferred construction of the negative plates makes it possible widely to vary the amount of electrolyte which passes through the respective electrodes so as to obtain maximum current from the battery.

FIGS. 5 and 6 show further modifications of electrode arrangements. As in the modification of FIG. 4, alternating positive and negative electrode plates are used in the arrangement of FIG. 5, separators with recesses 24 defined by ribs 27, as best shown in FIGS. 5, 9, and 10, being used in this arrangement. The separators also have knubs 26 on one side which permit ready access to the electrolyte flow, while the flat side 23 of the separators is flush with the negative electrode plates, the separator side carrying the ribs facing the positive plates. By alternating the position of the electrodes by 180°, the electrolyte coming from distributing chamber 11 will rise between the separators and the positive plates through the passages provided by the recesses in the separators and will then be forced to pass either through the positive plates or the separator itself, the negative electrode flush therewith, and the next adjacent separator because the sealing frame 25 of the separators, which is similar to sealing frames 29, will make any other flow of the electrolyte impossible. This automatically assures the major portion of the electrolyte to pass through the positive electrode plates, the selection of predetermined separator thicknesses making it possible to obtain any desired flow ratio.

The electrode plate arangement of FIG. 6 is also designed to follow the concept of bringing the electrolyte primarliy into intimate contact with the active mass of the positive plates. Here, too, positive and negative plates alternate with each other and the sealing is accomplished by elastic linings along apertured end plates 13 and 15 which hold the electrode plates in a fluid-impermeable manner. The sealing linings define electrolyte passageways 28 adjacent both sides of each second negative plate at the lower apertured plate 13. The electrolyte passes through these passageways, separators 23, and the adjacent positive plates toward the passageways 28', which are laterally offset from passageways 28 at the other side of the positive plates, to enter into overflow chamber 16. Because the pairs of passageways 28 on each side of the negative plates produces a pressure balance, no electrolyte will pass through the negative plates but will pass only therealong while being forced through the positive plates.

Figure 12:
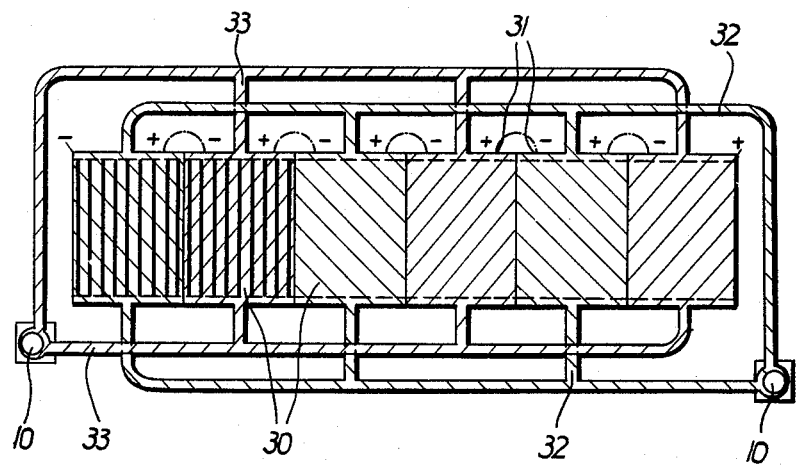

FIGS. 11 and 12 show embodiments of the invention wherein a plurality of battery cells are connected in series and fed by a circulating stream with constantly refreshed electrolyte. This system, too, is adapted for forming, charging and discharging, and it is quite simple to maintain the electrolyte in such a system at a desired operating temperature. The disadvantage of the arrangement of FIG. 11 lies in the fact that the battery may be subject to self-discharge at the cell connectors 31 and the associated electrolyte inlets when a single electrolyte circuit 10a is used to feed all battery cells 30.

This disadvantage is avoided by the system schematically indicated in FIG. 12, wherein two electrolyte circuits 32 and 33 are used to feed each adjacent pair of cells. Experiments have shown that this cuts the self-discharge to about one tenth of that of the arrangement of FIG. 11.

Figure 13:
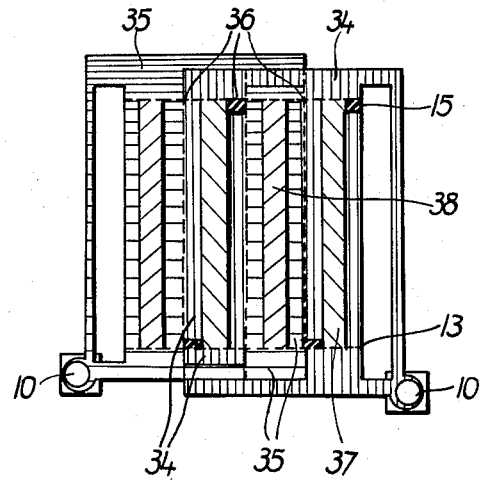
FIG. 13 is a schematic section of a storage battery wherein the electrode plates of different polarity are fed by two streams of electrolytes of different concentration.

FIG. 13 shows yet another embodiment of the present invention. In this embodiment, two electrolyte circuits 34 and 35 are provided to feed the electrodes 37 and 38 of opposite polarity separately. The electrolytes of the two circuits may be of the same or of different concentration. The electrode chambers are separated from each other by electron exchange membranes 36.

This arrangement has the advantage that the electrolyte may be forced to pass through the positive plates 37 while it flows along the negative plates 38 by suitable provision of sealing frames described in connection with FIGS. 3 to 5. Furthermore, the concentration of the electrolytes in the two circuits 34 and 35 may be so chosen as to obtain the maximum efficiency of the negative and positive battery plates. Thus, experiments have shown that it is highly advantageous to feed the negative plates of lead-acid batteries with sulfuric acid of a density of 1.04 to 1.25 while the density of the sulfuric acid passing through the positive plates may have values far exceeding the usual density of 1.22 to 1.28, i.e., up to 1.5.

Figure 14:
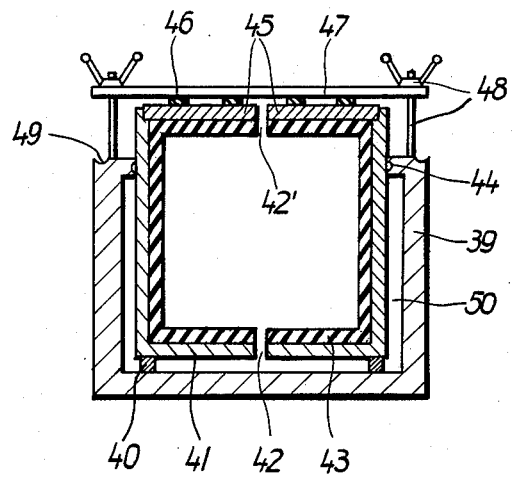
FIG. 14 shows a cross section of a tank for rapid formation.

FIG. 14 schematically shows an arrangement for forming battery plates according to the invention before they are mounted in the battery. The plates to be formed are separated by separators and inserted into a casing 41 having an electrolyte-resistant, elastic lining 43, for instance, of rubber or polyisobutylene. A longitudinally extending slot 42 is provided in a bottom wall of the casing and its lining. After the plates have been inserted in the casing, it is closed by cover 45, which also has an electrolyte-resistant, elastic lining similar to lining 43, the cover with its lining having a longitudinal slot 42' complementary to slot 42. The casing has only one end wall and its other end wall is formed by a movable platen which is pressed against the assembly of plates and separators in the casing after the same has been covered, so as to press the plates and separators together. The cover 45 is held by yoke 47 pressing against the cover through spacers 46 when the tension screws 48 are tightened. A similar tensioning means is used for the placing of the end platen. In this manner, all edges of the electrode plates are so tightly pressed against the elastic insulating lining 43 that no electrolyte may pass by the plates along their edges.

The packed casing is placed on spacers 40 in forming tank 39, an elastic flange 44 providing a fluid-impermeable seal between the side walls of the casing and the tank. The forming electrolyte is introduced under pressure into interspace 50 between the inner walls of the forming tank and the casing 41, enters through slot 42 into the interior of the casing, is directed to the plates by means of the separators, and leaves the casing through slot 42' whereupon it flows over the cover into gutters 49 provided along the rims of the tank to be directed to means for cooling and adjusting the concentration of the electrolyte by determination of conductance or by other means for reintroduction into the forming cycle.

It will be obvious to the skilled in the art that other forming arrangements may accomplish equivalent results. For instance, the plate and separator assembly may be packed tightly by pneumatic or hydraulic pressure means.

Because pressing of the electrolyte through the active mass of the positive and negative plates substantially completely eliminates an increase of the electrolyte concentration within the active mass, conventional forming times may be considerably shortened. Experiments have shown, for instance, that the formation current may be increased tenfold without any undesirable consequences for the life of the battery plates so formed. The plates formed with high formation currents are particularly suitable for high-amperage discharges. After the electrolyte concentration has reached the prescribed value, i.e. 1.285 for a 20-hour discharge, the concentration of the electrolyte may be increased, for instance, to a value in the range of 1.30–1.38 and preferably of 1.35 the current discharge may be tested, and the plates may subsequently be charged again.

In the production of dry-charged storage batteries, water is circulated through the battery plates until the wash water shows no further trace of electrolyte. After this, a 5% solution of boric acid is pumped through the plates for about 10 minutes to 20 minutes. After the boric acid is removed, for instance, by tilting the forming tanks by 180°, the plates may readily be dried with hot air or a hot inert gas. Since all of these steps are carried out by circulating the treating fluids, no material losses are incurred.

Comparing battery plates formed by circulating electrolytes with conventionally formed plates, it has been found that the capacity of such plates is at least about 75% above that of conventional plates, even after repeated charging and discharging cycles carried out according to the present invention.

If the battery plates are formed after they have been built in a storage battery provided with means for circulating the electrolyte, as herein described, the same advantages are obtained, it being understood, of course, that the circulating pump 10 is fed by outside current during the formation cycle.

It is a well-known fact that electrode plates can be formed in the battery container. But this process has the disadvantage that only small quantities of electrolyte can be used. It is, therefore, necessary to apply only weak currents because otherwise the electrolyte is heated up to temperatures which are too high. The duration of forming thereby is doubled at least. This waste of time will be eliminated if the electrolyte is forced to penetrate through the active mass of the electrodes. Furthermore the plates, already placed in the container, will not be removed and, therefore, will not be subjected to mechanical stress, because they remain in the container after formation.

In order to obtain technical data for the processes of forming, discharging and charging, a battery was used which has 17 positive electrode plates of a thickness of 1.3 mm. and 18 negative electrode plates of 1.6 mm. in thickness. The height and width of the plates is 210 mm. and 153 mm. respectively. The weight of a positive electrode including the lug of 25 x 35 mm. is 250 g., the weight of a negative electrode plate with the aforementioned lug is 310 g. The portion of the active positive mass amounts to 125 g. for one electrode plate, the portion of the negative active mass to 160 g.

The 20 hours' capacity of this cell is about 280 ampere hours.

The assembled element is shown in FIGS. 1 and 4. The battery is filled with 2 litres of sulphuric acid of a density of 1.06. There will be needed additional 0.5 litre of the sulphuric acid of the same concentration to fill the dead space, i.e., pump and pipe-lines.

In order to stiffen the unformed electrochemical active mass the container is filled up with sulphuric acid of a density of 1.06. The electrolyte is pressed through the active mass of the plates by a small overpressure of 0.05 kg./cm.$^2$; after about 10 minutes all pores of the active mass are filled. After a resting period of 20 minutes there is enough lead sulfate to give the active mass sufficient mechanical strength. The proper formation begins by adjusting the pressure of the pump to about 0.1–0.5 kg./cm.$^2$. At the same time a current of 50 a. flows through the plates of the storage battery for 30 minutes. Thereafter the current intensity is increased to 200 a. for three hours. As soon as the point of a certain gassing is attained, the current intensity is decreased to 50 a. During the whole formation process the electrolyte has a density of 1.06, because adequate quantities of water are added. The temperature of the electrolyte is kept at 27° C. by cooling. When within 4.5 hours the formation is finished the density of the electrolyte is increased to 1.285.

For the discharge of this cell with a circulating electrolyte of a density of 1.285, a pressure of 0.3 kg./cm.$^2$ will be required at the very beginning. During the discharge the pressure must be increased to about 0.38 kg./cm.$^2$, in order to keep the circulating quantity of the electrolyte constant, as the pores of the active material of the plates are partially clogged by the formation of lead sulfate. The total volume of the electrolyte comes to 2.5 litres, which is increased to about 3 litres by continuously adding concentrated sulphuric acid of a density of 1.83. The total volume of electrolyte is pressed through the plates twice a minute.

The discharge current is fixed at 500 amperes. The cell gives $$\frac{500}{60} = 8.33 \text{ ampere hours per minute}$$

and the consumption of sulphate-ions per minute is 30.4 g. or 18 cm.³, which is compensated by the addition of an adequate quantity of concentrated sulphuric acid of a density of 1.83. This causes the desired temperature rises up to 40–55° C. In addition the cell heats up due to the high discharge current, and after a total discharge-time of about 28–35 minutes, the temperature is around 50° C.

If the current remains constant during the discharge-process, it is easy by opening the valve set to a certain point to regulate the quantity of concentrated sulphuric acid which must be added to the circulating electrolyte. The constancy of the density of the electrolyte during the discharge can be controlled by use of a syringe hydrometer. In case the current required by the consuming device is temporally different, it is necessary not only to increase automatically the pumping speed according to the increasing or decreasing discharge current by means of a compound winding, but also to alter the valve. In this way the concentration of sulphate-ions which passes through the pores of the active mass is automatically adjusted to requirements. It is also possible to arrange in the reserve chamber a second pump of small efficiency which is in parallel connection with the pump circulating the electrolyte. In this case it is not necessary to regulate the valve opening, because the second small pump with rising discharge currents in spite of the valve openings, remaining unchanged, pumps a greater quantity of the concentrated sulphuric acid into the electrolyte. This greater quantity is adequate to the greater consumption of sulphate-ions per unit of time.

Practically the discharge with high-current has been finished when the discharge-voltage has dropped to 80% of the initial value. Furthermore, the charging of this discharged storage battery shall be described. The density of the acid is lowered to 1.2. The pump presses the sulphuric acid with a pressure of 0.3 kg./cm.² through the active mass of the electrode plates. The temperature of the circulating electrolyte is regulated from 27–30° C. The values arrived at during a prolonged charge are given in the following table:

*Table 1*

| Time | Current intensity | Density of sulphuric acid | Pressure | Ampere-hours |
|---|---|---|---|---|
| 1 hour | 5 | 1.2 | 0.3 | 5 |
| 3 hours | 70 | 1.2 | 0.3 | 210 |
| 2 hours | 20 | 1.2 | 0.3 | 40 |
| | | | | 255 |

After a charging of 255 ampere-hours the battery is overcharged with a small current intensity of about 5 a. for two hours. At the same time the sulphuric acid is adjusted to a density of 1.285.

The Table 2 shows values for a quick charging:

*Table 2*

| Time | Current intensity | Density of sulphuric acid | Pressure | Ampere-hours |
|---|---|---|---|---|
| 0.5 hour | 20 | 1.2 | 0.3 | 10 |
| 1.5 hours | 150 | 1.2 | 0.3 | 225 |
| 0.5 hours | 40 | 1.2 | 0.3 | 20 |
| | | | | 255 |

The principles and structural features of the present invention are applicable to all conventional storage batteries with acid electrolytes and since electrolyte composition per se, as well as plate and other materials form no part of the present invention, they are not described herein. Full information on such details of lead-acid batteries is available, for instance, from "Storage Batteries," by George Wood Vinal, published by John Wiley & Sons, Inc., New York.

In special cases of high-amperage batteries it is, of course, also possible to use measures not acceptable for storage batteries which are to be used repeatedly. For instance, in such cases zinc may be used for the negative battery plates, the cells may directly be connected and electrolytes such as perchloric acid $HClO_4$ or amidosulfo acid $(NH_2)SO_2(OH)$ may be used which dissolve the active mass. It may be advantageous to take electrode plates which have grids or perforated plates of graphite or of conducting resin.

One advantage of the circulating electrolyte resides in the fact that any active mass particles which are detached from the plates are carried away from the electrolyte container by the electrolyte and, for instance, can be assembled before the input of the pump.

It may be mentioned that the electron exchange membranes 36 in FIG. 13, as they are employed for separating the electrode chambers from each other are membranes, for instance, of a co-polymerisate of hydrochinone or vinylhydrochinone, phenol and formaldehyde in the ratio of 1 to 1 to 2 moles as described in "Zeitschrift für Elektrochemie" 57, p. 189 (1953).

The conditions during charging of the plates correspond to a large extent to those during formation. Forming with large currents produce short forming times and an increase in capacity for exceeding those heretofore obtainable. The same advantages are observed during charging. Suitably formed plates produce storage batteries with a capacity threefold of that of conventional batteries when the electrodes of the same polarity are fed by separate streams of suitably adjusted electrolytes.

The following explanations illustrate the electric arrangement.

The consuming device is in parallel connection with the pump 10. When starting a storage battery the current puts the motor of the consumer and the motor of the pump-equipment in motion. In connection with a pump-device in the addition chamber for the reserve electrolyte the motor of the pump requires only 0.5 to 3%, preferably 1.2–1.8%, of the electric effect of the battery and generally uses 400–1000 w. Therefore it starts faster than the main motor whereby the voltage is dropping. The voltage reaches its average height if the electrolyte is circulating with sufficient speed. Now the consuming device takes the pre-destined amount of current from the battery. The motor of the pump 10 is constructed in that manner that it stops pumping if the voltage of every cell consisting of one positive and one negative electrode plate has dropped from an initial value of 1.8 v. down to 1.5 v. The adaptation of the current consumption by the pump to the total current consumption is regulated in well-known manner in that the axle-tree of the pump is equipped with two motors which can be switched on and off together or single. As is also well known it is possible to influence the electric fields of the motors of the consumer and of the pump by aid of compound-windings, whereby the working of the pump-motor will be automatically raised if the consumption device requires increasing quantities of current.

As the schematic illustrations of various battery arrangements show, excellent use is made of space so that the total volume of the battery is hardly, if at all, increased by the means required for the control of the electrolyte concentration. This produces a heretofore unobtainable increase in the ratio of battery volume to battery capacity as well as in the ratio of weight to capacity in acid electrolyte storage batteries.

While the invention has been specifically described in connection with certain preferred embodiments, it will be readily understood that many variations and modifications may occur to the skilled in the art, without departing from the spirit and scope of this invention as defined in the appended claims.

We claim:

1. A storage battery with an acid electrolyte comprising a container for the electrolyte, electrode plates in said container, a first housing defining an electrolyte overflow chamber above said container and in communication therewith, at least one additional housing, each of said additional housings defining an addition chamber, inlet means for each addition chamber to permit the addition of a liquid medium which controls the specific weight of the electrolyte, a further housing defining a mixing chamber, liquid passageways between said overflow and addition chambers, respectively, and said mixing chamber, valve means in the passageway between the addition and mixing chambers, a pump having an input and an output, the input of the pump being in communication with the mixing chamber, and another housing defining an electrolyte distributing chamber below the electrolyte container, said distributing chamber being in communication with the output of the pump and the electrolyte container, respectively, whereby electrolyte may be continuously pressed and circulated through the active mass of the plates of at least one polarity and a liquid medium controlling the specific weight of the electrolyte may be added to the circulating electrolyte to obtain a desired specific weight level at the formation and each operating cycle of the battery.

2. The storage battery of claim 1, further comprising apertured plates separating the electrolyte container from the electrolyte distributing and overflow chambers, respectively.

3. The storage battery of claim 1, wherein each of said additional housings is arranged above said first housing and said further housing is arranged laterally adjacent the electrolyte container and below one of said additional housings.

4. The storage battery of claim 1, further comprising a gas removal conduit between the overflow chamber and at least one of said addition chambers, a pressure relief valve and a check valve in said conduit, and an electrolyte outlet means in said distributing chamber.

5. The storage battery of claim 1, further comprising apertured insulating plates separating the electrolyte container from the electrolyte distributing and overflow chambers, respectively, said apertured plates holding the electrode plates in position in the electrolyte container.

6. The storage battery of claim 5, wherein said insulating and electrode plates are horizontally arranged and the edges of the positive plates are flush with an inner wall of the electrolyte container.

7. The storage battery of claim 6, comprising an electrolyte-resistant lining of said inner wall, said lining providing a fluid-impermeable seal along the edges of the electrode plates.

8. The storage battery of claim 7, wherein said lining consists of a swellable material.

9. The storage battery of claim 7, wherein said lining consists of a plastic material, and the edges of each electrode plate are framed by an elastic insulating material, the cooperation between the plastic lining and the elastic insulating material providing said fluid-impermeable seal.

10. The storage battery of claim 9, wherein said elastic insulating material is rubber or polyisopropylene.

11. The storage battery of claim 1, wherein the electrode plates of negative polarity have a plurality of grid areas free of active mass.

12. The storage battery of claim 1, further comprising means in said electrode plates for increasing the resistance to the flow of the electrolyte in the direction of the flow.

13. The storage battery of claim 12, wherein said flow resistance increase means comprises decreased porosity of the electrode plates in the direction of the electrolyte flow.

14. The storage battery of claim 12, wherein the flow resistance increase means comprises increased thickness of the electrode plates in the direction of the electrolyte flow.

15. The storage battery of claim 1, further comprising very thin separator plates between the electrode plates, the separator plates being microporous and of large pore volume.

16. The storage battery of claim 1, further comprising lower and upper apertured plates separating the electrolyte container from the electrolyte distributing and overflow chambers, respectively, the electrode plates being arranged perpendicularly to the apertured plates, with one plate of negative polarity alternating with two plates of positive polarity, U-shaped fluid-impermeable frames of elastic, electrolyte-resistant insulating material sealing the spaces between the adjacent positive plates and the upper apertured plates and the inner walls of the container, respectively, and like frames sealing the spaces between the negative plates and the lower apertured plates and inner walls of the container, respectively.

17. The storage battery of claim 1, further comprising lower and upper apertured plates separating the electrolyte container from the electrolyte distributing and overflow chambers, respectively, the electrode plates being arranged perpendicularly to the apertured plates, with plates of negative polarity alternating with plates of positive polarity, and U-shaped fluid-impermeable frames of elastic, electrolyte-resistant insulating materials inserted in the container between adjacent ones of said electrode plates, said frames sealing the spaces between the electrode plates and the inner walls of the electrolyte container and the spaces between alternating ones of the electrode plates and the upper and lower apertured plates, respectively.

18. The storage battery of claim 17, wherein the negative plates are more resistant to the flow of electrolyte therethrough than the positive plates.

19. The storage battery of claim 1, further comprising lower and upper apertured plates separating the electrolyte container from the electrolyte distributing and overflow chambers, respectively, the electrode plates being arranged perpendicularly to the apertured plates, with plates of negative polarity alternating with plates of positive polarity, sealing means for sealing the edges of the plates in a fluid-impermeable manner, first passageways in said sealing means on each side of every second negative electrode plate at the lower one of the apertured plates and second passageways in said sealing means on the opposite side of every positive plate adjacent one of said first passageways, said second passageways being laterally offset from the adjacent one of the first passageways and being at the upper one of the apertured plates.

20. The storage battery of claim 1, wherein the electrolyte and the liquid medium comprises a strong acid selected from the group consisting of sulfuric acid, perchloric acid, and fluoboric acid, and mixtures thereof.

21. An arrangement for forming storage battery plates, comprising a casing including an end platen and a cover, means for moving the end platen and cover into and out of engagement with the casing walls, the plates and separators separating adjacent plates from one another being arranged in the casing parallel to the platen whereby they may be compressed in the casing by movement of the platen, an elastic electrolyte-resistant lining in the casing including the end platen and cover, the bottom wall with its lining and the cover with its lining each defining a longitudinally extending slot, a tank surrounding at least a portion of the casing, the casing being mounted in the tank with its bottom wall spaced from the bottom wall of the tank, means for sealing the casing in the tank in a fluid-impermeable manner, and means for circulating electrolyte through the tank.

22. The arrangement of claim 21, wherein said sealing means for the casing comprises an elastic flange of electrolyte-resistant material which extends from the walls of the tank and engages the walls of the casing.

23. The arrangement of claim 21, further comprising longitudinally extending gutters along the wall of the tank, said gutters receiving electrolyte flowing through the longitudinal slot in the casing cover and along said cover into the gutters.

References Cited in the file of this patent
UNITED STATES PATENTS

| | | |
|---|---|---|
| 852,464 | Sokal | May 7, 1907 |
| 1,106,719 | Lake | Aug. 11, 1914 |
| 2,584,117 | Elrad | Feb. 5, 1952 |
| 2,921,111 | Crowley et al. | Jan. 12, 1960 |
| 2,932,681 | Solomon | Apr. 12, 1960 |